United States Patent
Wettlaufer et al.

(10) Patent No.: US 11,031,847 B2
(45) Date of Patent: Jun. 8, 2021

(54) ELECTRIC DRIVE WITH STATOR WINDING AND CONTROL DEVICE SURROUNDED BY SHIELDING DEVICE

(71) Applicant: Lenze Drives GmbH, Extertal (DE)

(72) Inventors: Jan Wettlaufer, Hameln (DE); Holger Borcherding, Hessisch Oldendorf (DE)

(73) Assignee: Lenze Drives GmbH, Extertal (DE)

( * ) Notice: Subject to any disclaimer, the term of this patent is extended or adjusted under 35 U.S.C. 154(b) by 247 days.

(21) Appl. No.: 15/768,373

(22) PCT Filed: Oct. 11, 2016

(86) PCT No.: PCT/EP2016/074376
§ 371 (c)(1),
(2) Date: Apr. 13, 2018

(87) PCT Pub. No.: WO2017/064079
PCT Pub. Date: Apr. 20, 2017

(65) Prior Publication Data
US 2018/0309339 A1    Oct. 25, 2018

(30) Foreign Application Priority Data
Oct. 13, 2015 (DE) ..................... 10 2015 219 865.0

(51) Int. Cl.
*H02K 11/33* (2016.01)
*H02K 11/01* (2016.01)
(Continued)

(52) U.S. Cl.
CPC ........... *H02K 11/0141* (2020.08); *H02K 1/08* (2013.01); *H02K 1/14* (2013.01); *H02K 1/148* (2013.01);
(Continued)

(58) Field of Classification Search
CPC . H02K 3/44; H02K 3/28; H02K 11/01; H02K 11/21; H02K 11/27; H02K 11/33;
(Continued)

(56) References Cited

U.S. PATENT DOCUMENTS 6,927,524 B2    8/2005  Pyntikov et al.
10,008,910 B2*  6/2018  Jahshan .................... H02P 6/14
(Continued)

FOREIGN PATENT DOCUMENTS

CN    101814818 A    8/2010
DE    602 04 716 T2  5/2006
(Continued)

OTHER PUBLICATIONS

International Search Report (PCT/ISA/210) issued in PCT Application No. PCT/EP2016/074376 dated Dec. 1, 2016 with English translation (six pages).

(Continued)

*Primary Examiner* — Maged M Almawri
(74) *Attorney, Agent, or Firm* — Crowell & Moring LLP

(57) ABSTRACT

An electric drive includes a rotor and a stator in toothed-coil technology, wherein the stator has a number of individual tooth modules. A respective individual tooth module has a stator winding which is wound around an associated tooth, a control device which is designed to generate an activation signal for the stator winding, and a shielding device which surrounds the stator winding and the control device.

10 Claims, 4 Drawing Sheets

(51) Int. Cl.
| | |
|---|---|
| *H02K 1/08* | (2006.01) |
| *H02K 1/14* | (2006.01) |
| *H02K 11/21* | (2016.01) |
| *H02K 11/27* | (2016.01) |
| *H02K 11/35* | (2016.01) |
| *H02K 3/18* | (2006.01) |
| *H02K 3/44* | (2006.01) |
| *H02K 11/00* | (2016.01) |
| *H02K 3/28* | (2006.01) |

(52) U.S. Cl.
CPC ............... *H02K 3/18* (2013.01); *H02K 3/44* (2013.01); *H02K 11/0094* (2013.01); *H02K 11/21* (2016.01); *H02K 11/27* (2016.01); *H02K 11/33* (2016.01); *H02K 11/35* (2016.01); *H02K 3/28* (2013.01); *H02K 2213/06* (2013.01); *H02K 2213/12* (2013.01)

(58) Field of Classification Search
CPC ........ H02K 11/35; H02K 11/08; H02K 11/14; H02K 11/148; H02K 1/08; H02K 1/14; H02K 1/148; H02K 11/0094; H02K 3/18; H02K 2213/06; H02K 3/12; H02K 11/0141; H02K 1/0094; H02K 1/28; H02K 1/18; H02K 1/12
USPC ..................... 310/68 B, 179–208, 89, 88, 87

See application file for complete search history.

(56) References Cited

U.S. PATENT DOCUMENTS

| | | | | |
|---|---|---|---|---|
| 2003/0193264 | A1* | 10/2003 | Pyntikov, V | ........... H02K 1/141 310/254.1 |
| 2004/0200057 | A1* | 10/2004 | Maslov | ................. H02K 1/141 29/596 |
| 2011/0025312 | A1* | 2/2011 | Nagano | ................ G01D 5/2497 324/207.25 |
| 2011/0156505 | A1* | 6/2011 | Miyashita | ............ G01D 5/2451 310/46 |
| 2011/0291532 | A1* | 12/2011 | Takeuchi | ................ B60L 58/40 310/68 B |
| 2014/0015384 | A1* | 1/2014 | Someya | ................... G01B 7/30 310/68 B |
| 2014/0117790 | A1* | 5/2014 | Sakamoto | ............. H02K 1/185 310/44 |
| 2014/0191624 | A1 | 7/2014 | Jahshan | |
| 2015/0318772 | A1 | 11/2015 | Jahshan | |
| 2016/0372995 | A1* | 12/2016 | Smith | .................... H02K 21/24 |

FOREIGN PATENT DOCUMENTS

| | | |
|---|---|---|
| DE | 11 2011 102 869 T5 | 6/2013 |
| WO | WO 2014/089613 A1 | 6/2014 |
| WO | WO 2015/134855 A1 | 9/2015 |

OTHER PUBLICATIONS

German-language Written Opinion (PCT/ISA/237) issued in PCT Application No. PCT/EP2016/074376 dated Dec. 1, 2016 with English translation (12 pages).
English translation of Chinese Office Action issued in Chinese Application No. 201680060222.X dated May 28, 2019 (11 pages).

* cited by examiner

ELECTRIC DRIVE WITH STATOR WINDING AND CONTROL DEVICE SURROUNDED BY SHIELDING DEVICE

BACKGROUND AND SUMMARY OF THE INVENTION

The invention relates to an electric drive.

The invention is based on the object of providing an electric drive which has the highest possible operational reliability with respect to environmental influences.

The invention achieves this object by means of an electric drive having a rotor and a stator in toothed-coil technology, wherein the stator has a number of individual tooth modules. A respective individual tooth module has a stator winding which is wound around an associated tooth, a control device designed to generate an activation signal for the stator winding, and a shielding device surrounds the stator winding and the control device.

The electric drive has a rotor.

The electric drive also has a stator in toothed-coil technology. With regard to the toothed-coil technology, reference is also made to the relevant technical literature. The stator has a number of individual tooth modules, for example a number of between 3 and 36.

A respective individual tooth module conventionally has a stator winding which is wound around an associated tooth.

The individual tooth module also has a control device, for example having a microcontroller or an FPGA, which is designed to generate an activation signal, in particular a pulse-width-modulated activation signal, for example in the form of an activation current or an activation voltage, for the stator winding.

The individual tooth module also has a shielding device which surrounds the stator winding and the control device and seals them, in particular hermetically, with respect to the environment.

A respective control device can have an electric fuse element in order to prevent an intermediate circuit short in the event of a fault in the individual tooth module, for example.

A respective control device can have a power semiconductor module and/or an electric energy store, for example in the form of a capacitor.

A respective control device can have a device for detecting the rotor position, with the result that it is possible to generate the control signal on the basis of the rotor position, for example.

A respective control device can have an energy supply connection which can be used to connect the individual tooth module to a central energy supply, for example in the form of a DC intermediate circuit.

The electric drive can have a superordinate controller having a data connection to the control devices of the respective individual tooth modules.

The shielding device can have or can be a housing, in particular made of sheet steel, wherein the housing partially or completely surrounds the stator winding and the control device.

The shielding device can be formed from potting compound containing soft magnetic particles, wherein the potting compound partially or completely surrounds the stator winding and the control device.

The rotor can be provided with markings for coding the rotor position on its circumference.

The rotor can be in the form of a permanent magnet rotor or a reluctance rotor.

The invention provides a highly integrated drive constructed from hermetically sealed and individually protected individual tooth modules.

The drive is advantageously constructed as a multiphase drive comprising n individual tooth modules in order to keep the loss of torque as low as possible if an individual tooth module fails.

The winding of the electromechanical converter is advantageously in the form of a single-layer winding in order to rule out damage to the adjacent winding if heat develops on account of a winding short circuit or the like.

Each individual tooth module can be provided with an integrated fuse element (for example safety or semiconductor fuse) which prevents the (common) intermediate circuit from being short-circuited in the event of a fault.

The shielding device in the form of hermetic sealing is advantageously configured in such a manner that it is not destroyed even if the power semiconductor module explodes or in the event of a winding fire (for example as a result of a short circuit).

An electronic module (for example microcontroller or FPGA and associated peripherals) is advantageously integrated in the power semiconductor module or is directly arranged on the latter.

The rotor of the electromechanical energy converter is advantageously in the form of a permanent magnet rotor or reluctance rotor.

All connections outside the individual tooth module may be present in redundant form.

Inputs of the superordinate controller and regulating means and the data connections between the individual tooth modules are advantageously electrically isolated.

The hermetic sealing can be configured in such a manner that it ensures electromagnetic shielding of the enclosed electronics. As a result, it acts as EMC shielding between the enclosed components and the environment.

The individual tooth modules may be advantageously potted with a flame-retardant and electrically non-conductive compound (for example casting resin). The potting may be impermeable to liquids and gases. The potting may be additionally filled with soft magnetic particles, for example magnetite. However, it is still electrically non-conductive.

The rotor may be provided with markings (optical or magnetic) on its circumference, from which the devices for detecting the rotor position can determine the rotational angle of the rotor.

The following functions can be completely or partially implemented by means of the control device, for example: activation of the power semiconductors (gate drivers), current measurement, PWM, temperature measurement, communication, protective functions (if the protection against overcurrent is integrated, the separate fuse element can be dispensed with), detection of the rotor position (in at least one individual tooth module), regulation of the machine (if the individual tooth module forms a master), emergency regulation of the machine (if all communication fails, each individual tooth module can operate autonomously).

BRIEF DESCRIPTION OF THE DRAWINGS

The invention is described in detail below with reference to the drawings, in which.

DETAILED DESCRIPTION OF THE DRAWINGS

Figure 1:
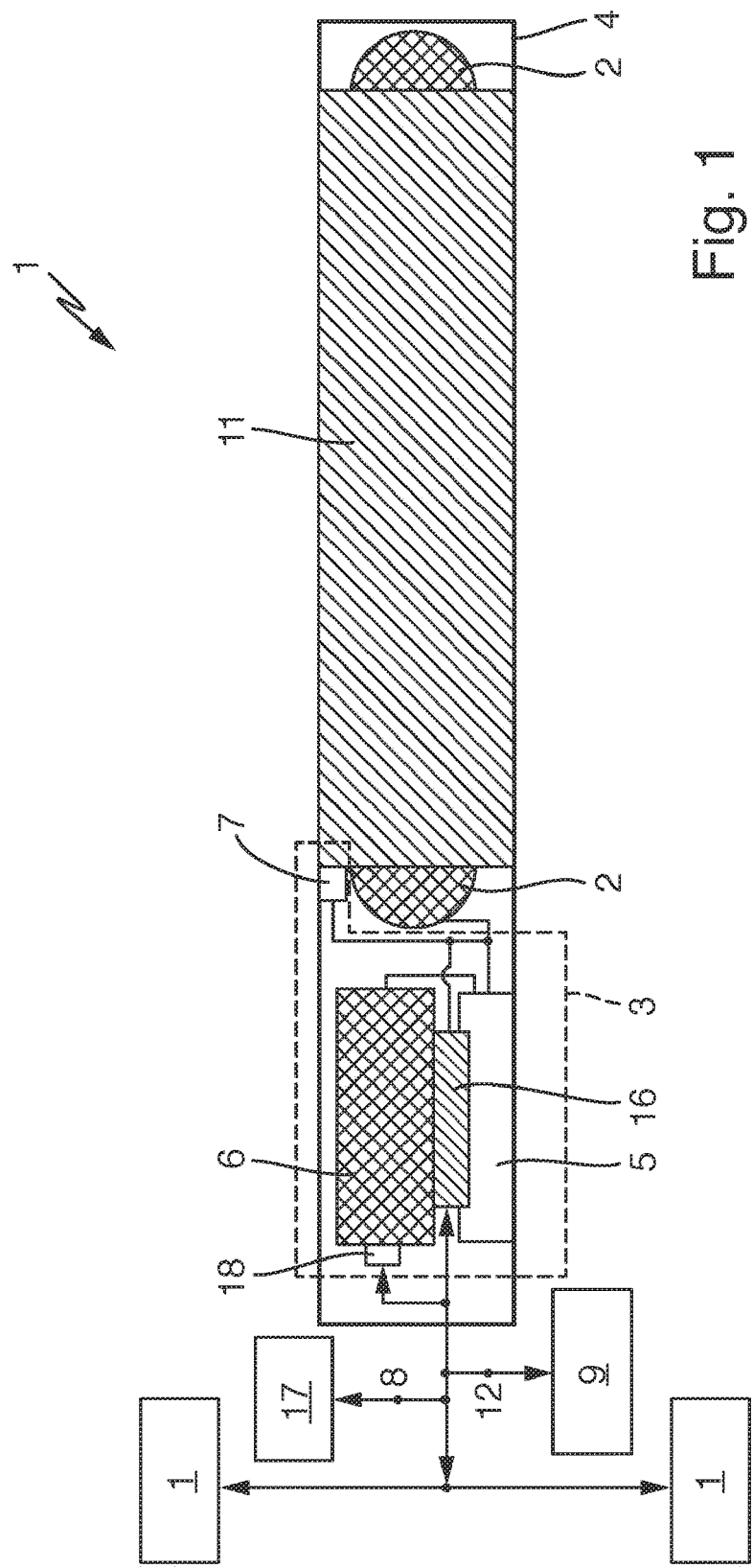
FIG. 1 schematically shows an individual tooth module according to the invention in accordance with a first embodiment, FIG. 2 schematically shows an individual tooth module according to the invention in accordance with a further embodiment, FIG. 3 schematically shows a topology of a logical connection of the individual tooth modules to a superordinate control unit according to a first embodiment, FIG. 4 schematically shows a topology of a logical connection of the individual tooth modules to a superordinate control unit according to a further embodiment, and FIG. 5 schematically shows a plurality of individual tooth modules which are connected in a parallel manner to a voltage intermediate circuit.

FIG. 1 shows, by way of example, a single individual tooth module 1 of a plurality of individual tooth modules which are part of an electric drive (not illustrated in any more detail). The electric drive also has a rotor (not illustrated) and a stator in toothed-coil technology and a rotor (not illustrated any further), wherein the individual tooth modules 1 are part of the stator.

The rotor may be in the form of a permanent magnet rotor or a reluctance rotor, for example.

A respective individual tooth module 1 has a stator winding 2 which is wound around an associated tooth 11 made of electrical steel sheet. In the present case, only winding heads of the stator winding 2 are schematically shown for reasons of the simpler illustration.

The individual tooth module 1 has a control device 3 which is designed to generate an activation signal for the stator winding 2. For this purpose, the control device 3 has an electric fuse element 18, a power semiconductor module 5, an electric energy store 6, an optional device 7 for detecting the rotor position and an electronic module 16. The electronic module 16 may have, for example, a microcontroller or an FPGA and associated peripheral components such as resistors, capacitors, coils, A/D converters etc.

The control device 3 has an energy supply connection 8 for connection to an energy supply or a DC intermediate circuit 17.

A data transmission connection 12 is also provided, by means of which the control device 3 has a data connection to a superordinate controller 9.

Figure 3:
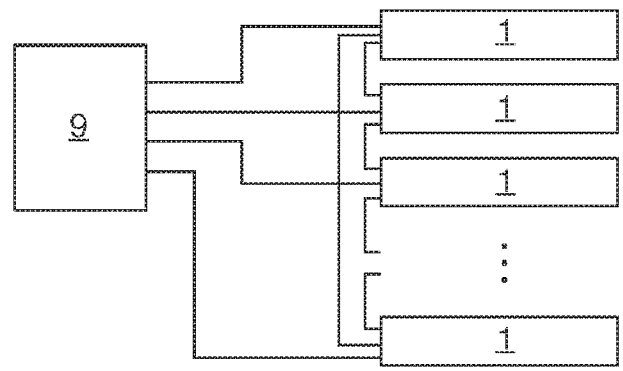

FIG. 3 shows, by way of example, a possible topology of a logical connection of the individual tooth modules 1 to the superordinate controller 9. One of the individual tooth modules 1 is defined as a master and regulates the electric drive and monitors communication. If the master individual tooth module fails, one of the previous slave individual tooth modules is defined as the new master individual tooth module and regulates the drive. If the superordinate controller 9 or the connection to the latter fails, the master starts an emergency program in which it regulates the modules to a predefined operating point.

Figure 4:
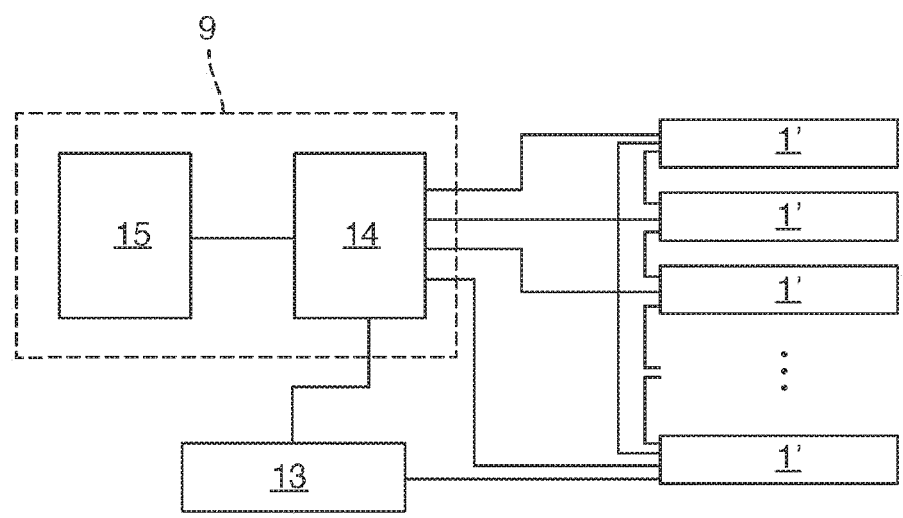

If the individual tooth modules 1 do not have a device 7 for detecting the rotor position, a central device 13 for detecting the rotor position may be alternatively provided, as shown in FIG. 4, which central device transmits the rotor position to the individual tooth modules via the respective data transmission connections 12, the device 13 also being able to be integrated in one of the individual tooth modules. If the rotor position detection fails, the drive can also continue to be operated in a regulated manner without a sensor. If the application allows, it is also possible to completely dispense with a system for detecting the rotor position.

Furthermore, the controller 9 is additionally expanded in FIG. 4 with a superordinate regulation block 14 and a control block 15, the control block 15 also being able to be provided in the controller 9 from FIG. 3.

The individual tooth module 1 in FIG. 1 has a shielding device 4 in the form of a sheet steel housing which surrounds the stator winding 2 and the control device 3 and shields them from the environment.

Figure 2:
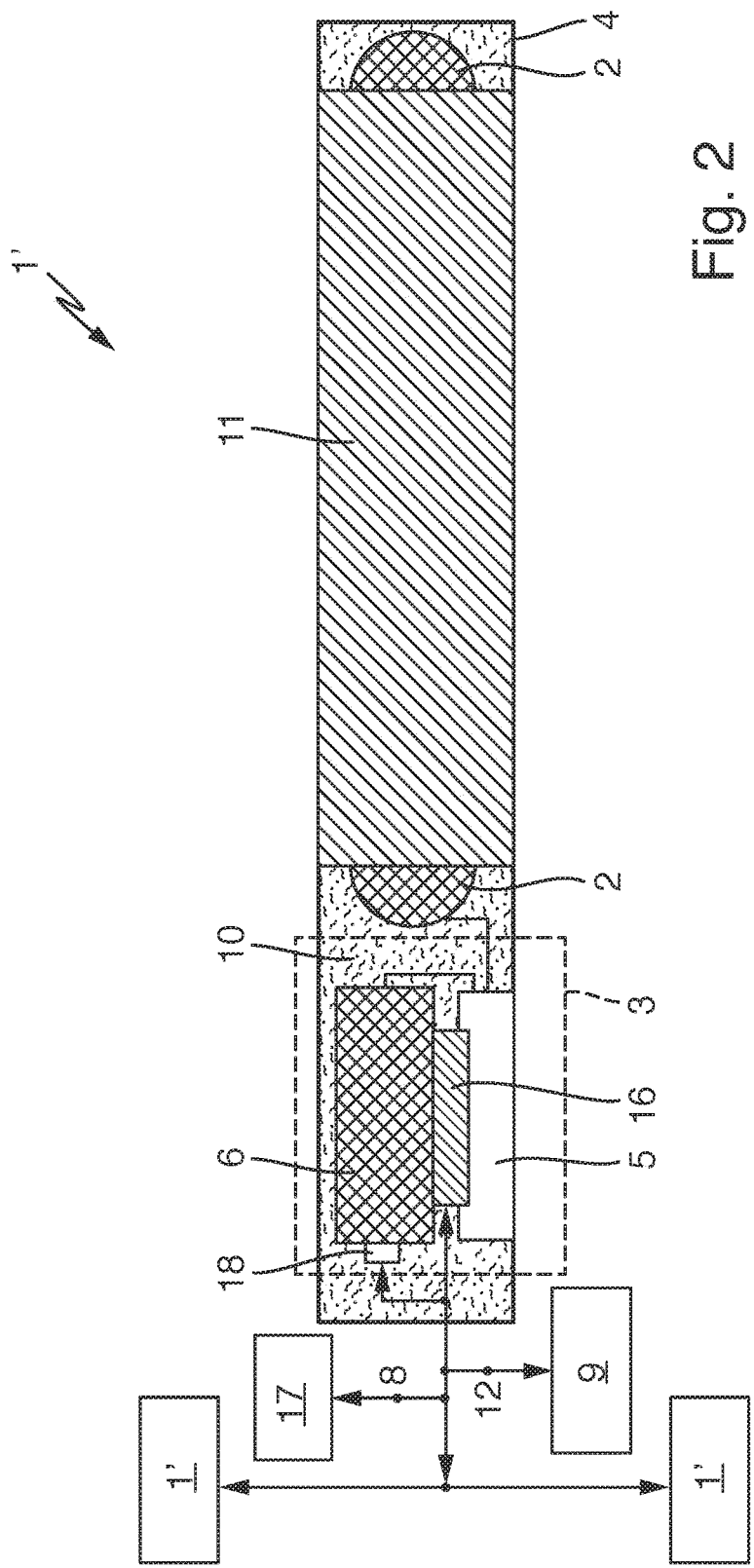

FIG. 2 shows an embodiment of an individual tooth module 1' without a device 7 for detecting the rotor position, in which the shielding device is formed from potting compound 10 containing soft magnetic particles, the potting compound 10 surrounding the stator winding 2 and the control device 3. The housing 4 of the embodiment from FIG. 1 may likewise be filled with potting compound.

If an individual tooth module 1, 1' fails, there is a reduction in the torque. The loss of torque is reduced by the structure comprising as many individual tooth modules 1, 1' as possible. The necessary overdimensioning for compensating for a single fault is greatly reduced in comparison with 3-phase or 6-phase systems. As a result, the drive can have a smaller structure and this saves material, installation space and weight.

If a winding 2 is destroyed by a winding short or external mechanical effects (for example penetration of a foreign body through the housing), this does not have any further effects other than the destruction of this one winding and the proportionate loss of torque.

The fuse element 18 prevents a short circuit in the DC intermediate circuit as soon as a serious fault results in the failure of an individual tooth module 1, 1'. This results in increased operational reliability.

On account of the structure according to the invention, the installation effort is reduced and fewer electrical connections are required, thus reducing the number of possible fault sources.

The electric drive may be a synchronous machine, a synchronous reluctance machine or a BLDC machine, for example.

The shielding device prevents electromagnetic influencing of the electronics and the influencing of the environment by the individual tooth module.

The potting compound cannot catch fire and, as a result, also prevents the burning of the potted components. Defects as a result of mechanical effects, for example strong vibrations, can therefore be avoided. The drive is still functional even when liquid enters the housing.

Figure 5:
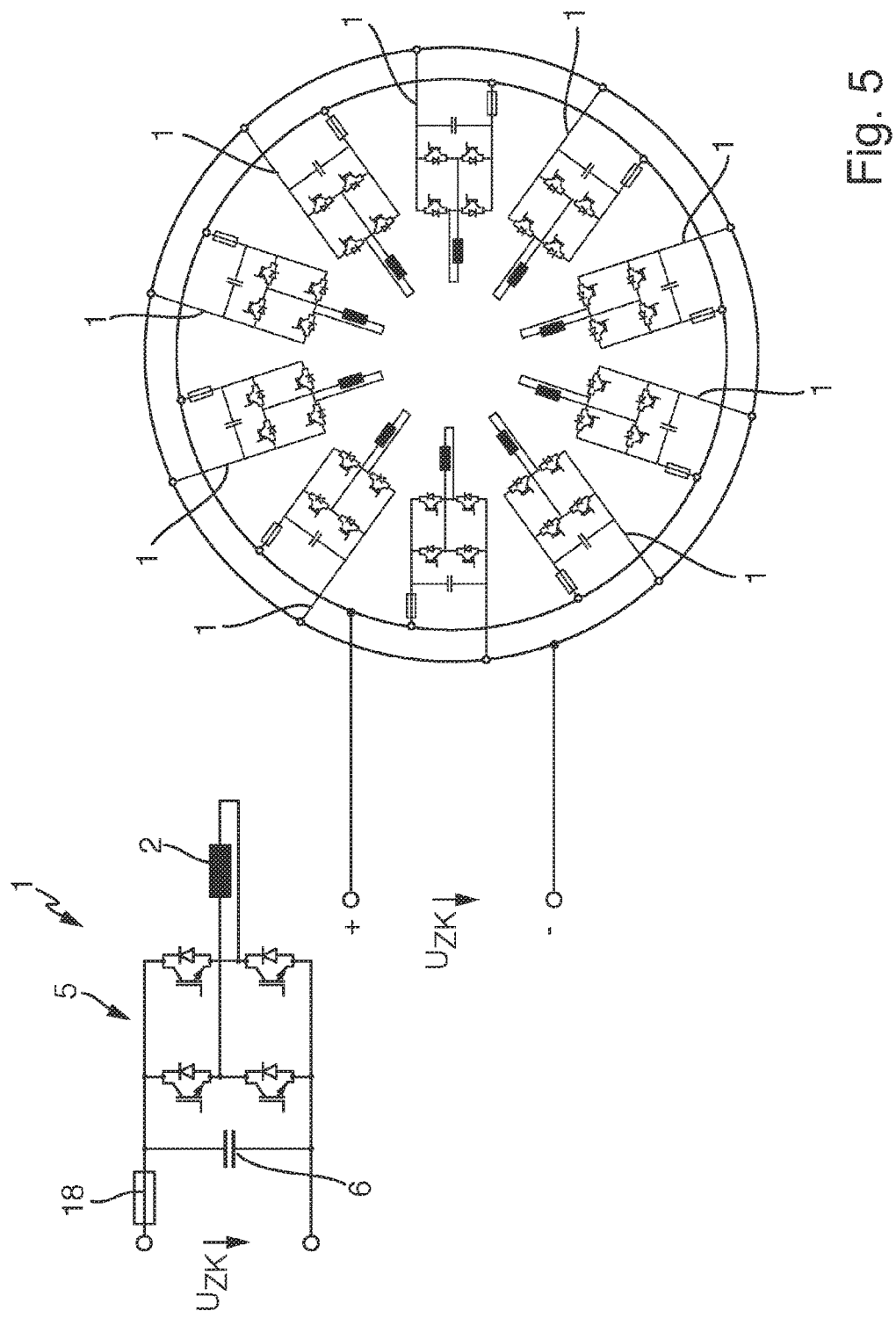

FIG. 5 shows, in a highly schematic manner, a plurality of individual tooth modules 1 which are connected in a parallel manner to a voltage intermediate circuit or DC intermediate circuit. The individual tooth modules 1 are uniformly distributed over a circumference of the stator. It goes without saying that, in addition to the components 2, 18, 5 and 6 shown, yet further components (not illustrated) may typically be present, for example current sensors, voltage sensors, temperature sensors, (load) resistors, coils, capacitors, etc.

What is claimed is:

1. An electric drive, comprising:
   a rotor; and
   a stator in toothed-coil technology, wherein the stator has a number of individual tooth modules, wherein each individual tooth module has:
   a stator winding which is wound around an associated tooth,
   a control device which is designed to generate an activation signal for the stator winding, and a shielding device which surrounds the stator winding and the control device.

2. The electric drive as claimed in claim 1, wherein a respective control device has an electric fuse element.

3. The electric drive as claimed in claim 1, wherein a respective control device has a power semiconductor module and/or an electric energy store.

4. The electric drive as claimed in claim 1, wherein a respective control device has a device for detecting the rotor position.

5. The electric drive as claimed in claim 1, wherein a respective control device has an energy supply connection.

6. The electric drive as claimed in claim 1, wherein the electric drive has a superordinate controller which has a data connection to the control devices of the respective individual tooth modules.

7. The electric drive as claimed claim 1, wherein the shielding device has a housing made of sheet steel, wherein the housing partially or completely surrounds the stator winding and the control device.

8. The electric drive as claimed in claim 1, wherein the shielding device is formed from potting compound containing soft magnetic particles, wherein the potting compound partially or completely surrounds the stator winding and the control device.

9. The electric drive as claimed in claim 1, wherein the rotor is provided with markings for coding the rotor position on its circumference.

10. The electric drive as claimed in claim 1, wherein the rotor is in the form of a permanent magnet rotor or a reluctance rotor.

\* \* \* \* \*